2,987,516
CYCLOALKYLAMINE SALTS OF PYRIMIDINE ACETIC ACIDS
Roman P. Holysz, Kalamazoo, Richard V. Heinzelman, Kalamazoo Township, Kalamazoo County, and Douglas A. Shepherd and Patrick H. Seay, Kalamazoo, Mich., assignors to The Upjohn Company, Kalamazoo, Mich., a corporation of Delaware
No Drawing. Filed Oct. 23, 1959, Ser. No. 848,223
4 Claims. (Cl. 260—256.4)

This invention relates to novel substituted pyrimidine salts and, more particularly, to cycloalkylamine salts of 5 - cyano - 3,4 - dihydro - $\alpha$ - lower - alkyl - 2,4 - dioxo-1(2H)-pyrimidineacetic acid.

The compounds of this invention can be characterized by the following structural formula:

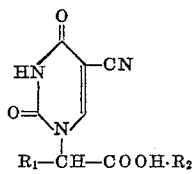

wherein $R_1$ is a lower alkyl group having 1 through 4 carbon atoms, i.e., methyl, ethyl, propyl, isopropyl, butyl, isobutyl or $\alpha$-sec.-butyl, and $R_2$ is a cyclic amine having 5 through 8 carbon atoms, i.e., cyclopentylamine, cyclohexylamine, cycloheptylamine and cyclooctylamine. Specifically included are the D-, L- and DL- forms of the foregoing compounds.

The cycloalkylamine salts of the 5-cyano-3,4-dihydro-$\alpha$ - lower - alkyl - 2,4 - dioxo - 1(2H) - pyrimidineacetic acids as herein defined unexpectedly possess marked and significant anti-secretory activity, whereas the corresponding free acids are essentially devoid of such activity. For example, in laboratory studies with rats the cyclohexylamine salt of DL-5-cyano-3,4-dihydro - $\alpha$ - methyl - 2,4 - dioxo - 1(2H) - pyrimidineacetic acid was found to reduce gastric secretion by from 17 to 37 percent on doses ranging from 1 to 10 mg. per kg. body weight. The corresponding free acid, on the other hand, in comparable tests, was found either to increase gastric secretion or to reduce it insignificantly. Nor is this paradox explainable in terms of the independent activity of the cycloalkylamines for they, like the free acids, are for practical purposes inactive as anti-secretory agents. For example, comparable laboratory studies on cyclohexylamine revealed no significant anti-secretory activity.

The novel compounds of this invention can be prepared, for example, by first obtaining $\alpha$-cyano-$\beta$-ethoxy-N-ethoxycarbonylacrylamide from N-cyanoacetylurethane as described by Shaw et al., J. Chem. Soc. 1834 (1955). Thereafter, the said ethoxyacrylamide can be reacted with the appropriate amino acid by the method of Atkinson et al., J. Chem. Soc. 4118 (1956), to give the corresponding 5-cyano-3,4-dihydro-$\alpha$-lower-alkyl-2,4-dioxo-1(2H)-pyrimidineacetic acid. The optical isomer of the free acid product will be D-, L- or DL-, depending on the configuration of the amino acid employed. The desired cycloalkylamine salt of D-, L- or DL-5-cyano - 3,4 - dihydro - $\alpha$ - lower alkyl - 2,4 - dioxo-1(2H)-pyrimidineacetic acid can then be obtained by the addition of the appropriate cyclic amine to the said free acid.

The said cycloalkylamine salts are useful in the treatment of conditions incident to gastric hypersecretion in mammals and birds. Current methods for the treatment of such conditions, i.e., peptic ulcer, involve the administration of anti-secretory compounds which possess concomitant anti-cholinergic activity, and the inhibition of gastric secretion is obtained through depression of the vagus nerve. Such compounds, for this reason, frequently give rise to the typical side affects of anticholinergic compounds, such as dryness of the mouth, tachycardia and blurring of vision. The novel compounds of this invention, however, exhibit a pronounced ability to inhibit gastric secretion but are virtually devoid of anti-cholinergic activity. Hence, administration of a cycloalkylamine salt of a 5-cyano-3,4-dihydro-$\alpha$-lower - alkyl - 2,4 - dioxo - 1(2H) - pyrimidineacetic acid, preferably the cyclohexylamine salt of DL-5-cyano-3,4 - dihydro - $\alpha$ - methyl - 2,4 - dioxo - 1(2H) - pyrimidineacetic acid, as the principal active ingredient in pharmaceutical compositions taking the form of tablets, pills, capsules, syrups, elixirs, and the like affords convenient and effective oral therapy for the treatment of conditions attributable to gastric hypersecretion, e.g., peptic ulcer. In general, an oral dosage unit containing from about 2 to about 500 mg., preferably from about 10 to about 100 mg., of a cycloalkylamine salt of a 5-cyano-3,4 - dihydro - $\alpha$ - lower - alkyl - 2,4 - dioxo - 1(2H)-pyrimidineacetic acid given 3 or 4 times daily affords effective therapy. The precise dosage must be determined with reference to the patient's age, weight and clinical condition.

The oral pharmaceutical forms in which the active ingredient can be administered include conventional solid and liquid diluents, flavoring agents, bodying materials, suspending agents, preservatives and the like in accord with standard pharmaceutical practice in the formulation of orally administrable compositions. Parenteral compositions comprising aqueous or oil solutions or suspensions can include the customary preservatives, suspending agents (where applicable), and the like.

The following examples illustrate the best mode contemplated by the inventors for carrying out the invention, but such examples should not be construed as limiting the scope thereof.

*Example 1—Cyclohexylamine salt of DL-5-cyano-3,4-dihydro - $\alpha$ - methyl - 2,4 - dioxo - 1(2H) - pyrimidineacetic acid*

A mixture of 4.45 gm. of DL-alanine and 2.08 gm. of sodium hydroxide is dissolved in 10 ml. of water. To this solution is added a mixture of 10.5 gm. of $\alpha$-cyano-$\beta$-ethoxy-N-ethoxycarbonylacrylamide [Shaw, J. Chem. Soc. 1834 (1955)] in 6 ml. of hot ethanol. The resulting mixture is heated under reflux for 4 hours. Thereafter, 5 ml. of concentrated hydrochloric acid is added to neutralize the alkali and liberate the free acid from its sodium salt. The free acid product mixture is concentrated under vacuum to a thick syrup, and the semi-solid residue dissolved in about 30 ml. of boiling alcohol. The product is then filtered to separate sodium chloride and the clear alcoholic filtrate concentrated under vacuum to a syrup. The syrup is dissolved in 50 ml. of hot ethanol and filtered. The clear filtrate is thereafter concentrated to about 20 ml., and 6.0 gm. of cyclohexylamine is added thereto. Crystallization is permitted to develop, and after equilibrium is attained the crystals are separated, washed with a small quantity of ethanol and dried to give 10.6 gm. of the cyclohexylamine salt of DL-5-cyano-3,4-dihydro-α-methyl-2,4-dioxo-1(2H)-pyrimidineacetic acid, M.P. 229–232° C. (dec.), which darkens at 185° C. Recrystallization from methanol gives a substantially pure product, M.P. 246–250° C. (dec.), $\lambda_{max.}^{water}$ 218, 281 m$\mu$, $\lambda_{max.}^{0.01 N\ sulfuric\ acid}$ 215,278 m$\mu$ and the following analysis:

Calculated for $C_{14}H_{20}N_4O_4$: C, 54.53; H, 6.54; N, 18.17.
Found: C, 54,43; H, 6.37; N, 18.23.
Infrared data were consistent with the structure.

The cyclohexylamine salts of the corresponding ethyl, propyl, isopropyl, butyl, isobutyl and α-sec.-butyl free acids can be prepared by addition of a cyclohexylamine to the said free acids, which are obtainable by substituting the appropriate amino acid for the DL-alanine above, as described by Atkinson et al., supra.

Similarly, other cycloalkylamine salts of the foregoing free acids can be prepared by addition of the desired cyclic amine, such as cyclopentylamine, cyclohexylamine, cycloheptylamine and cyclooctylamine, to the free acid, i.e., the D-, L- or DL- form of 5-cyano-3,4-dihydro-α-lower-alkyl-2,4-dioxo-1(2H)-pyrimidineacetic acids in which the lower alkyl is ethyl, propyl, isopropyl, butyl, isobutyl or α-sec.-butyl.

*Example 2—Tablets*

One thousand tablets, each containing 10 mg. of the cyclohexylamine salt of DL-5-cyano-3,4-dihydro-α-methyl-2,4-dioxo-1(2H)-pyrimidineacetic acid, can be prepared from the following ingredients:

| | |
|---|---|
| Cyclohexylamine salt of DL-5-cyano-3,4-dihydro-α-methyl - 2,4 - dioxo - 1(2H) - pyrimidineacetic acid _____gm__ | 10 |
| Dried aluminum hydroxide gel _____gm__ | 600 |
| Oil of peppermint _____ml__ | 2 |
| Ethyl alcohol _____ml__ | 10 |
| Calcium stearate _____gm__ | 12 |
| Sucrose-starch paste (1:2) _____gm__ | 200 |

The aluminum hydroxide gel is granulated with the sucrose-starch paste and dried. The dried granules are then mixed throughly with the finely powdered active ingredient and sprayed with the peppermint oil dissolved in the ethyl alcohol. Calcium stearate is then added and the mixture compressed into tablets in the usual manner.

The foregoing tablets can be administered in the treatment of gastric hypersecretion in humans and animals on a dosage schedule of 1 tablet 4 times a day.

One hundred grams of the cyclohexylamine salt of DL - 5 - cyano - 3,4 - dihydro - α - methyl - 2,4 - dioxo-1(2H)-pyrimidineacetic acid can be substituted for the 10 gm. above and the aluminum hydroxide gel omitted to give tablets, each containing 100 mg. of active ingredient, which can be administer on the same dosage schedule for the treatment of gastric hypersecretion in humans and animals.

*Example 3—Capsules*

One thousand capsules, each containing 50 mg. of the cyclohexylamine salt of DL-5-cyano-3,4-dihydro-α-methyl-2,4-dioxo-1(2H)-pyrimidineacetic acid, can be prepared from the following ingredients:

| | |
|---|---|
| Cyclohexylamine salt of DL-5-cyano-3,4-dihydro-α - methyl - 2,4 - dioxo - 1(2H) - pyrimidineacetic acid _____gm__ | 50 |
| Scopolamine methylbromide _____gm__ | 2.5 |
| Phenobarbital _____gm__ | 15 |
| Starch _____gm__ | 162.5 |
| Talc _____gm__ | 64 |
| Hard gelatin capsules No. 1. _____ | 1000 |

The powdered ingredients are mixed, screened and encapsulated in the usual manner.

The foregoing capsules are effective in the treatment of gastric hypersecretion in humans and animals on a dosage schedule of 1 capsule given 3 or 4 times daily.

For the supplementary active ingredients in the foregoing formulation, there can be included such ingredients as tranquilizers, antacids, sedatives, cholinergic blocking agents selectively active in the gastrointestinal tract, and other agents having activities desirably associated with the anti-secretory activity of the novel principal active ingredient, the cyclohexylamine salt of DL-5-cyano - 3,4 - dihydro - α - methyl - 2,4 - dioxo - 1(2H)-pyrimidineacetic acid. These supplementary ingredients can also be employed in the compositions of Examples 2 and 4.

*Example 4—Syrup*

One thousand milliliters of a syrup, containing in each 5 ml. 25 mg. of the cyclohexylamine salt of DL-5-cyano-3,4 - dihydro - α - methyl - 2,4 - dioxo - 1(2H) - pyrimidineacetic acid, can be prepared from the following ingredients:

| | |
|---|---|
| Cyclohexylamine salt of DL-5-cyano-3,4-dihydro-α - methyl - 2,4 - dioxo - 1(2H) - pyrimidineacetic acid _____gm__ | 5 |
| Sucrose _____gm__ | 500 |
| Color _____gm__ | 0.2 |
| Lemon oil _____ml__ | 0.3 |
| Methylparaben _____gm__ | 1 |
| Glycerin _____ml__ | 100 |
| Deionized water, q.s. _____ml__ | 1000 |

Two hundred milliliters of deionized water are heated to 85° C. and the methylparaben added. When the methylparaben is dissolved the glycerin is added, together with an additional 200 ml. of water, the color and the sucrose. The resulting solution is stirred until the sucrose is dissolved. After cooling, the flavor, active ingredient and balance of the water are added.

The foregoing syrup is effective in the treatment of gastric hypersecretion in humans and animals on a dosage schedule of 2 teaspoonsfuls 3 or 4 times per day.

In the compositions of Examples 2 through 4, any of the compounds of Example 1, e.g., the cyclopentylamine, cycloheptylamine or cyclooctylamine salts, can be substituted for the cyclohexylamine salt of DL-5-cyano-3,4-dihydro-α-methyl-2,4-dioxo-1(2H)-pyrimidineacetic acid to yield tablets, capsules, and parenteral solutions or suspensions as representative pharmaceutical forms which can be employed in the treatment of gastric hypersecretion in humans and animals on the same dosage schedule and within the same dosage ranges as disclosed for the said cyclohexylamine salt of said Examples 2 through 4. Moreover, the supplementary ingredients disclosed in Example 3 hereof in conjunction with the said cyclohexylamine salt are likewise suitable for use together with any of the compounds of Example 1 in the compositions disclosed.

What is claimed is:
1. Cycloalkylamine salts of 5-cyano-3,4-dihydro-α- lower-alkyl-2,4-dioxo-1(2H)-pyrimidineacetic acids of the following formula:

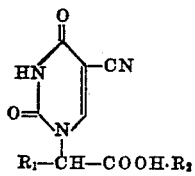

wherein $R_1$ is a lower alkyl group having 1 through 4 carbon atoms and $R_2$ is an unsubstituted cycloalkyl amine having 5 through 8 carbon atoms.

2. Cycloalkylamine salts of 5-cyano-3,4-dihydro-α-methyl-2,4-dioxo-1(2H)-pyrimidineacetic acid in which the alkyl group has 5 through 8 carbon atoms.

3. Cycloalkylamine salts of 5-cyano-3,4-dihydro-α-lower-alkyl-2,4-dioxo-1(2H)-pyrimidineacetic acid in which the lower alkyl group has 1 through 4 carbon atoms.

4. Cyclohexylamine salt of DL-5-cyano-3,4-dihydro-α methyl-2,4-dioxo-1(2H)-pyrimidineacetic acid.

References Cited in the file of this patent

Atkinson et al.: Jour. Chem. Soc., page 4118 (1956).
Stinson et al.: Chem. Abs. vol. 50, page 194 (1956).